United States Patent
Broten

[11] Patent Number: 6,048,068
[45] Date of Patent: Apr. 11, 2000

[54] WHEEL ROTATION MARKER

[76] Inventor: Timothy S. Broten, Box 29, Starbuck, Manitoba, Canada, R0G 2P0

[21] Appl. No.: 09/204,684

[22] Filed: Dec. 3, 1998

[51] Int. Cl.⁷ ....................................................... G02B 5/12
[52] U.S. Cl. ........................... 359/524; 359/522; 359/546; 359/548; 359/520; 224/42.12; 116/28 R
[58] Field of Search ..................... 359/522, 524, 359/549, 548, 520, 550, 533, 546, 523; 116/35 R, 28 R; 224/42.12

[56] References Cited

U.S. PATENT DOCUMENTS

| | | | |
|---|---|---|---|
| 4,046,397 | 9/1977 | Kitrell | 280/289 R |
| 4,194,809 | 3/1980 | Campagna | 350/97 |
| 4,194,810 | 3/1980 | Eller | 350/99 |
| 4,280,348 | 7/1981 | Teston | 70/166 |
| 4,289,376 | 9/1981 | Vukadinovic | 350/99 |
| 4,635,583 | 1/1987 | Cox | 116/28 R |

*Primary Examiner*—Cassandra Spyrou
*Assistant Examiner*—Leo Boutsikaris
*Attorney, Agent, or Firm*—Adrian D. Battison; Murray E. Thrift

[57] ABSTRACT

The present invention relates to a marker for indicating wheel rotation for a truck. The marker fits onto the wheel and turns with the wheel. The marker has a reflective end to allow vision during less visible occasions. The marker is mounted on the wheel stud and when the wheel stud is fastened the wheel marker is pressed between the rim and the wheel nut. The marker's reflective end rests on the outer portion of the rim.

4 Claims, 5 Drawing Sheets

WHEEL ROTATION MARKER

FIELD OF THE INVENTION

The present invention relates to a marker for indicating to a driver of a vehicle that the wheels of the vehicle are properly rotating.

BACKGROUND

When driving a large truck a driver is unable to see the rear tires rotate. Tires occasionally lock due to ice and many other different reasons and when the tires lock a driver has no indication of the problem. The present invention allows the driver to identify whether a tire is rotating or not. A driver will see the device and be able to stop before any permanent damage or injuries occur.

SUMMARY

According to the present invention there is provided a marker for indicating rotation of a wheel of a vehicle comprising an elongate strip member of plastics material having a hole at one end shaped and arranged to fit over a wheel stud of a vehicle wheel such that the strip can be located on the wheel stud by a nut, the strip having at least a portion thereof at the other end which is formed of a readily visible material, the strip having a length such that the portion is visible beyond a rim of the wheel when mounted on the stud.

Preferably, the strip member having a width which is greater than that of the hole by an amount sufficient only to mount on the wheel stud.

Preferably, the strip member has a constant width.

Preferably, the strip member has a thickness sufficient that the strip is substantially stiff so as to extend from the wheel stud to the wheel rim and to remain in contact with the wheel rim during rotation of the wheel.

A reflective portion is formed by a strip of reflective material wrapped around an end of the strip member.

Preferably, the strip member is formed of nylon.

An aspect of the present invention is a method for indicating rotation of a wheel of a vehicle comprising:

providing an elongate strip member of plastics material having a hole at one end;

fitting the hole over a wheel stud of a vehicle wheel;

locating the strip on the stud by a nut;

the strip having at least a portion thereof at the other end which is formed of a readily visible material the strip having a length such that the strip bends from the wheel nut to a rim of the wheel and such that the portion is visible beyond the rim.

the strip having a length such that the strip bends from the wheel nut to a rim of the wheel and such that the portion is visible beyond the rim.

Preferably the strip member has a width which is greater than that of the hole by an amount sufficient only to mount on the wheel stud.

the strip member has a constant width.

the strip member has a thickness sufficient that the strip is substantially stiff so as to extend from the wheel stud to the wheel rim and to remain in contact with the wheel rim during rotation of the wheel.

the reflective portion is formed by a strip of reflective material wrapped around an end of the strip member.

the strip member is formed of nylon.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
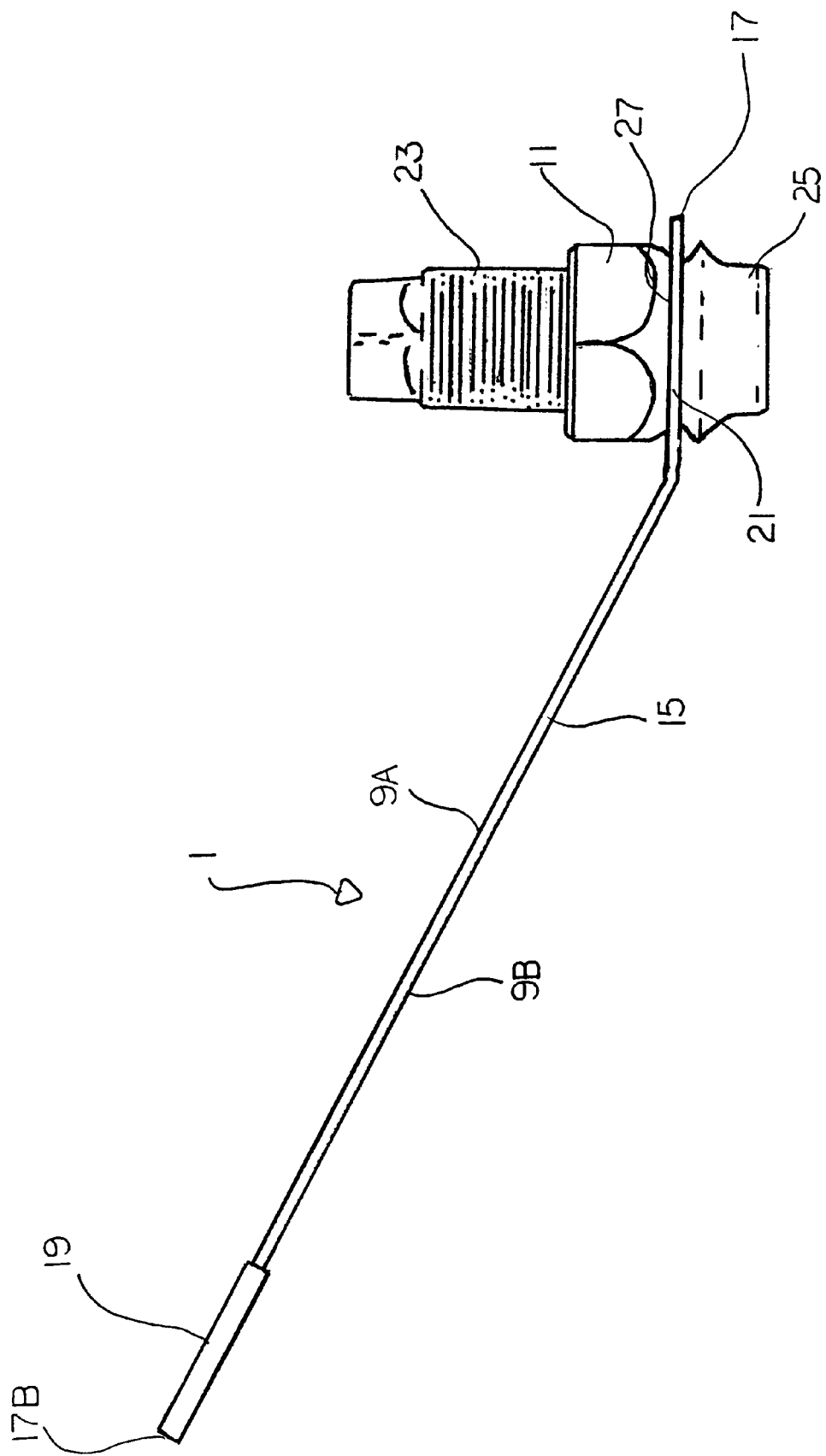
FIG. 1 is a side view of the present invention.
Figure 2:
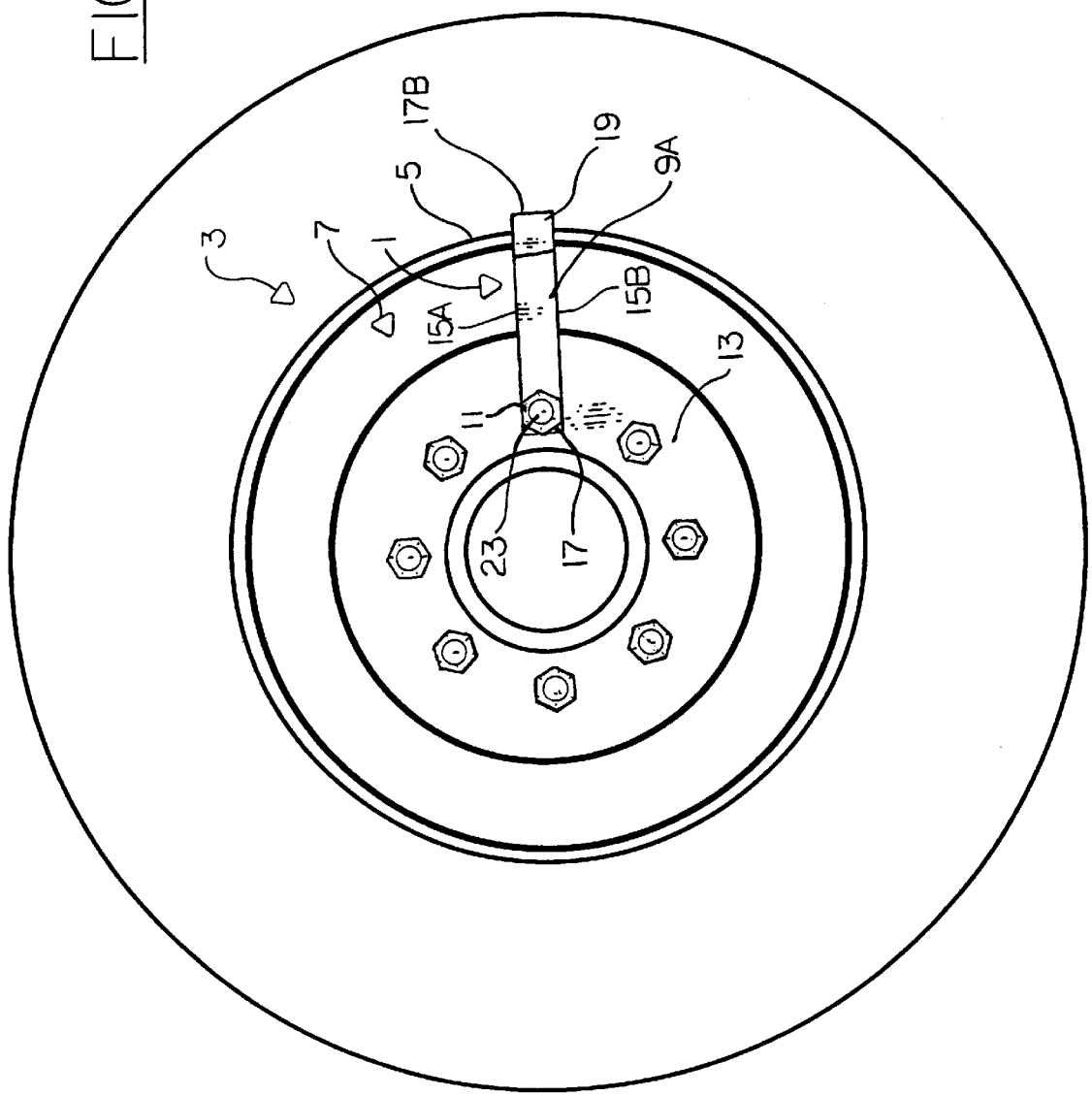
FIG. 2 is top view of the present invention on a wheel.
Figure 3:
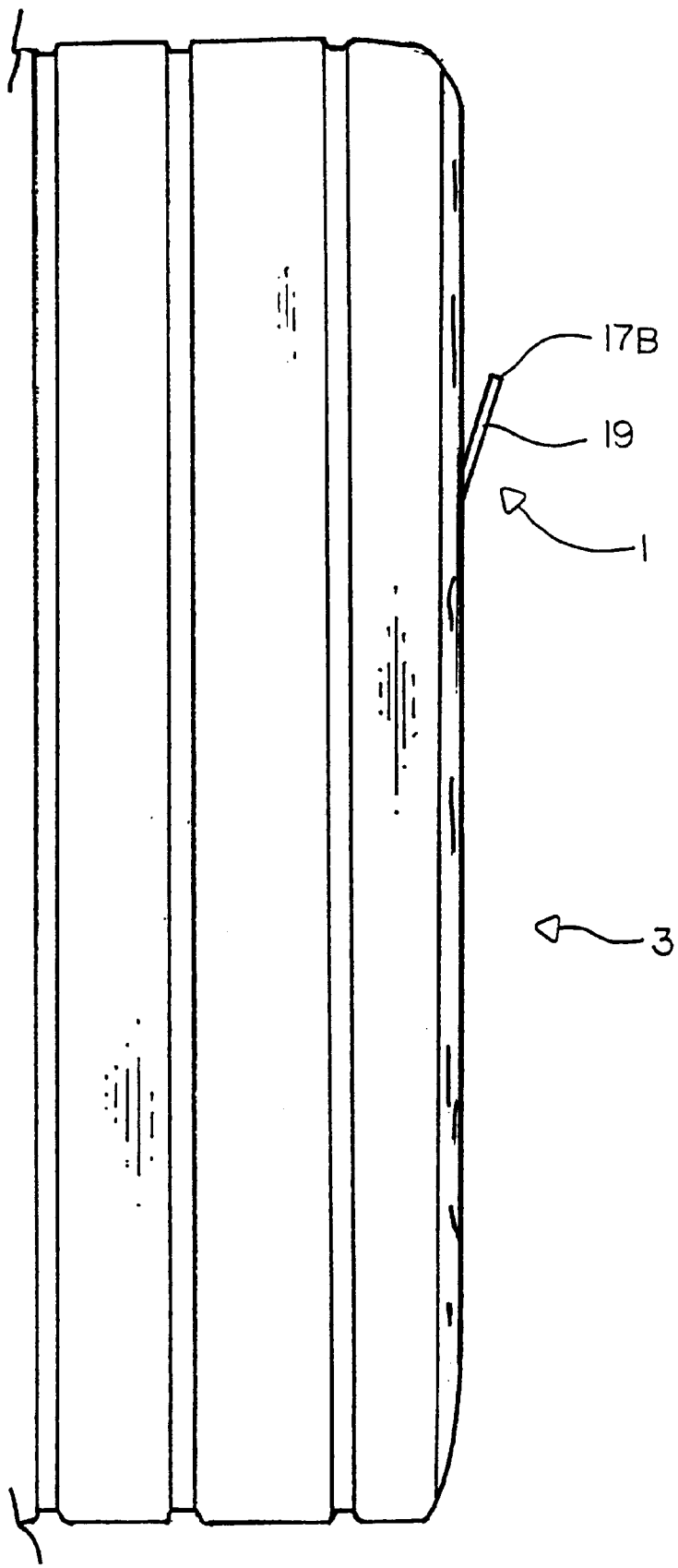
FIG. 3 is a front view of the present invention of FIG. 2.
Figure 4:
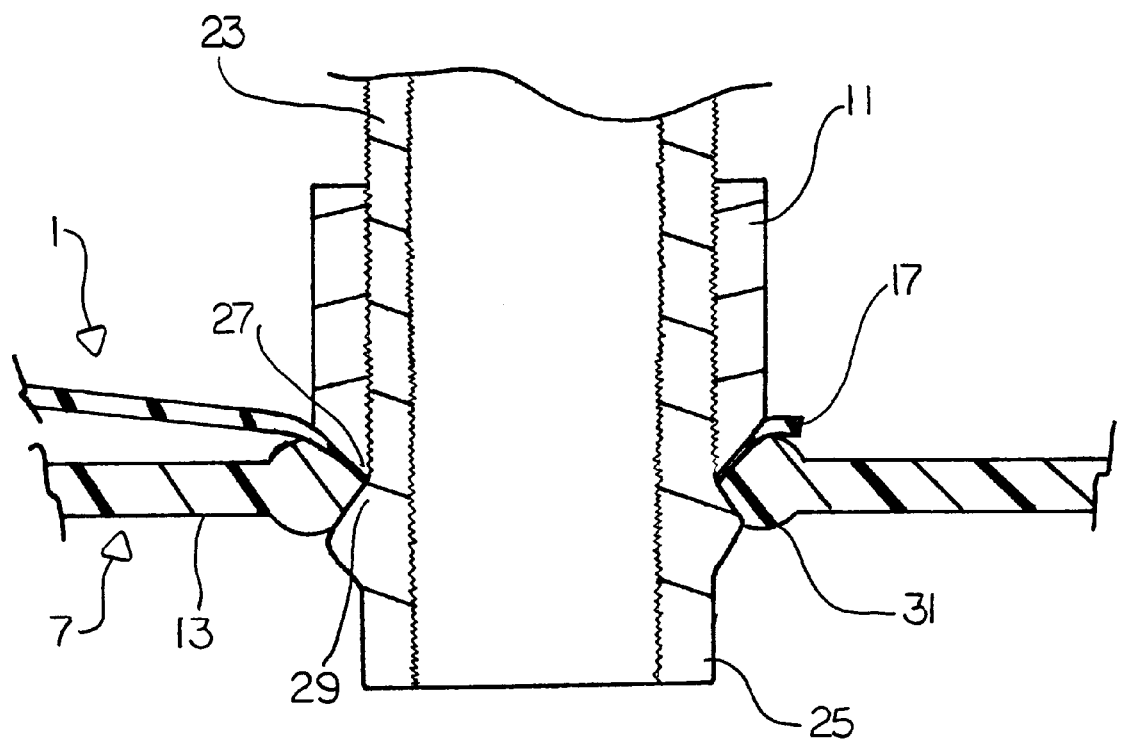
FIG. 4 is a partial horizontal cross section of a first arrangement of the present invention mounted on a wheel.
Figure 5:
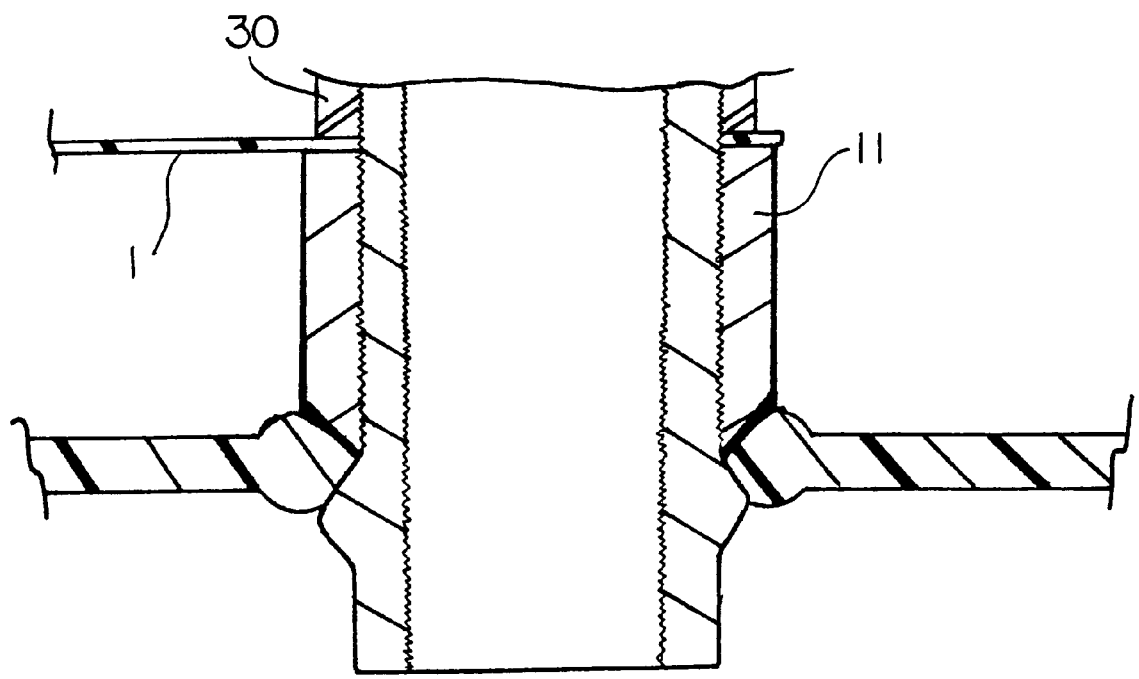
FIG. 5 is a partial horizontal cross section of a second arrangement the present invention mounted on a wheel.

A marker 1 for indicating rotation of a wheel 3 comprises a flexible elongated strip which is sufficiently rigid material so that the marker 1 remains in contact with the rim edge 5 of the rim 7. The marker 1 is a flat strip of nylon material wherein the top side 9A and the bottom side 9B is of constant width and is sufficiently wider that that of the wheel nut 11 so it can be tightened with the wheel nut 11 onto the center disk 13 of the rim 7. The first edge 15A and the second edge 15B of the marker 1 is sufficiently thin to allow the wheel nut 11 to compress the inner most end 17 of the marker 1.

When the marker 1 is tightened onto the wheel 3 the outer most end 17B rests on the rim edge 5 in order for the reflective material 19 to be visible to the driver of the vehicle. The reflective material 19 is attached to the outer most end 17B of the marker 1.

As the wheel nut 11 is tightened to the center disk 13, the inner most end 17 of the marker 1 is compressed forming a compressed portion 21. The wheel nut 11 is tightened by screwing it onto the wheel stud 23. The inner end 17 has a hole 27 shaped and arranged to fit over the wheel stud 23 of the vehicle, which the wheel stud is inserted through. The marker 1 has a width which is greater than that of the hole 27 by an amount sufficient only to mount on the wheel stud 23. The wheel stud 23 has a wheel stud head 25 which is on the opposing side of the center disk 13.

The center disk 13 has a circular space 29 which the wheel stud 23 is inserted through. The circular space 29 has an outer ridge 31 which enables an exact seal between the stud 23 and the nut 11. As the stud 11 is tightened the compressed portion 21 is clinched such that the required force is communicated through the marker 1 to the wheel stud 23 to hold the wheel in place.

In the second arrangement, the strip is modified so that it is unitary and wholly formed from a readily visible plastics material such as a bright yellow or orange nylon. Thus the outer end is directly visible without the necessity for a reflective strip. In this embodiment also, the strip is not pinched between the wheel nut and the wheel disk but is instead attached by an additional lock nut 30 which pinches the strip at the hole between the wheel nut and the lock nut to hold the strip in place.

Different wheel constructions of course require different length of the strip. Also different hole size is required for different stud diameters. In practice, three styles of wheels are currently commercially available. Two of these require strips of 16 inch length and a width of 1.5 inch and a thickness of 0.125 inch. The hole size is either 1.125 inch or 0.875 inch. In another style, the length is 10 inches and the hole size is 0.75 inch. The material is yellow UV resistant plastic No. 07100001. Only one device is installed on each wheel. The device does not interfere with noticing whether a wheel nut is loose. The device is visible to the driver from the cab but does not encroach on the maximum allowable road width.

While one embodiment of the present invention has been described in the foregoing, it is to be understood that other embodiments are possible within the scope of the invention. The invention is to be considered limited solely by the scope of the appended claims.

I claim:

1. A combination comprising:

a vehicle wheel having a wheel hub with a plurality of mounting studs extending from the hub;

a wheel rim having an outer rim edge and a central disk mounted on the hub by a plurality of mounting holes engaged over the studs;

and a plurality of wheel nuts holding the central disk on the hub;

and a marker for providing visual indication of rotation of the wheel;

the marker consisting solely of an elongate flat strip of plastics material having a hole at one end engaged over a single one of said mounting studs of the vehicle wheel;

the strip having a portion thereof at the other end which is formed of a readily visible material;

the strip being formed of a sufficiently rigid material such that it extends from the single one of said mounting studs to the outer rim edge of the wheel, where it remains in contact with the rim edge;

and the strip having a length such that the portion is visible just beyond the outer rim edge of the wheel.

2. A combination comprising:

a vehicle wheel having a wheel hub with a plurality of mounting studs extending from the hub;

a wheel rim having an outer rim edge and a central disk mounted on the hub by a plurality of mounting holes engaged over the studs;

and a plurality of wheel nuts holding the central disk on the hub;

and a marker for providing visual indication of rotation of the wheel;

the marker consisting solely of an elongate flat strip of plastics material having a hole at one end engaged over a single one of said mounting studs of the vehicle wheel;

the whole of the strip being unitary and formed of a readily visible material;

the strip being formed of a sufficiently rigid material such that it extends from the single one of said mounting studs to the outer rim edge of the wheel, where it remains in contact with the rim edge;

and the strip having a length such that a portion thereof is visible just beyond the outer rim edge of the wheel.

3. A combination comprising:

a vehicle wheel having a wheel hub with a plurality of mounting studs extending from the hub;

a wheel rim having an outer rim edge and a central disk mounted on the hub by a plurality of mounting holes engaged over the studs;

and a plurality of wheel nuts holding the central disk on the hub;

and a marker for providing visual indication of rotation of the wheel;

the marker consisting solely of an elongate flat strip of plastics material having a hole at one end engaged over a single one of said mounting studs of the vehicle wheel;

the strip having a portion thereof at the other end which is formed of a readily visible material;

the strip being formed of a sufficiently rigid material such that it extends from the single one of said mounting studs to the outer rim edge of the wheel, where it remains in contact with the rim edge;

and the strip having a length such that the portion is visible just beyond the outer rim edge of the wheel;

the strip being held in place on the single one of said mounting studs by a lock nut on top of the wheel nut on the stud.

4. The combination according to claim 3 wherein the whole of the strip member is unitary and formed of a readily visible material.

* * * * *